Oct. 30, 1951  L. M. SCHMIDT  2,573,280

CONTINUOUSLY VARIABLE HIGH-VOLTAGE POWER SUPPLY

Filed Feb. 14, 1951  2 SHEETS—SHEET 1

INVENTOR
L. M. SCHMIDT

BY
ATTORNEYS

Oct. 30, 1951  L. M. SCHMIDT  2,573,280
CONTINUOUSLY VARIABLE HIGH-VOLTAGE POWER SUPPLY
Filed Feb. 14, 1951  2 SHEETS—SHEET 2

INVENTOR
L. M. SCHMIDT
BY
ATTORNEYS

Patented Oct. 30, 1951

2,573,280

UNITED STATES PATENT OFFICE 2,573,280

CONTINUOUSLY VARIABLE HIGH-VOLTAGE POWER SUPPLY

Lothar M. Schmidt, Syracuse, N. Y., assignor to the United States of America as represented by the Secretary of the Navy Application February 14, 1951, Serial No. 210,926

5 Claims. (Cl. 201—48)

The present invention relates to a resistance proportioning network, and more particularly to a resistance proportioning providing a constant effective resistance having a vernier adjustment.

Presently available potentiometers do not provide accurate adjustment of the resistance ratio produced by the instrument, especially where the resistance of the potentiometer is of the order of several megohms. However, certain types of instruments require resistance proportioning potentiometers suitable attachment to voltages of several thousand volts and capable of accurate adjustment over a wide range. For such an installation, a constant resistance of the order of fifty megohms is often required, and the weight and size of the resistance proportioning network is preferably small.

The present invention provides a resistance proportioning network having a constant input resistance and a vernier adjustment over the full resistance of the network and which is small and inexpensive to produce. The network comprises two similar variable resistances operated simultaneously in opposite senses and connected to respective ends of a potentiometer whose movable contact serves as the adjustable tap of the network. As the variable resistances are operated, one variable resistance decreases its resistance at the same time the other increases its resistance, so that the total resistance remains constant and the potentiometer can be shifted in the network to any desired point. The potentiometer has a resistance only a small part of the effective resistance of the network and therefore provides an effective and simple vernier for the network.

It is an object of the present invention to provide an improved resistance proportioning network having a vernier control thereof.

It is a further object of the present invention to provide a resistance proportioning network presenting a constant high resistance and having a vernier control thereof.

It is a further object of the present invention to provide a resistance proportioning network suitable for connection to a source of high voltage.

Further objects and advantages of the present invention will be readily apparent from consideration of the following specification relating to the appended drawings in which.

The resistance proportioning network of the present invention is applicable to numerous types of circuits, and is not limited to use as an adjustable voltage divider, as herein described for purposes of explanation. However, such an application of the present invention is explained for the purposes of clarity.

Figure 1:
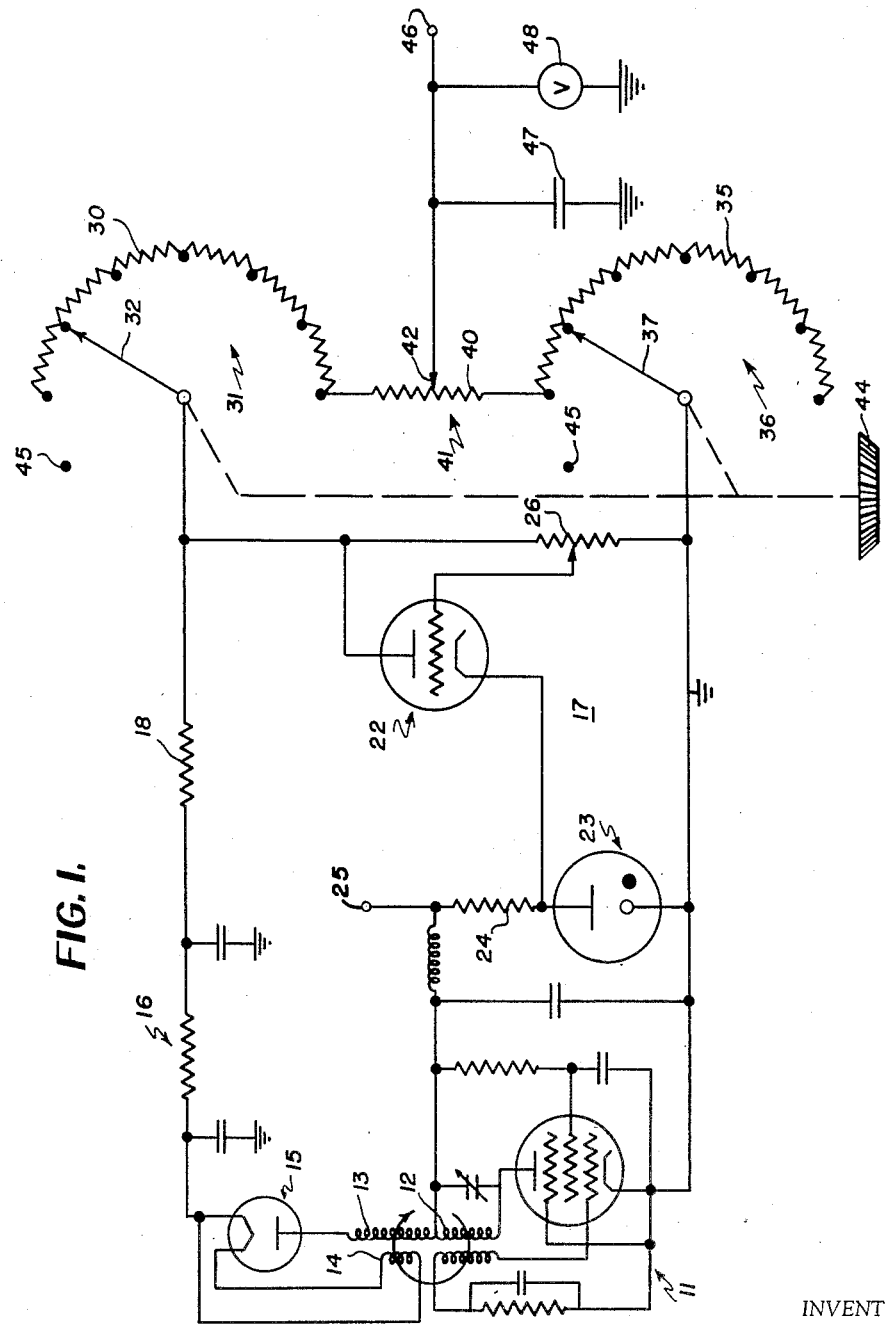
Fig. 1 is a schematic diagram of the present invention.

Referring now to the drawings, there is shown in Fig. 1 a portable high voltage power supply with an electronic voltage regulator to which the resistance proportioning network is connected. It will be apparent to those skilled in the art that the present network is applicable to many types of circuit and that the application herein described is illustrative of only a single use thereof.

The high voltage power supply is of conventional design, and comprises an oscillator 11 producing sustained oscillations in an output coil 12 which functions as a transformer primary for the windings 13 and 14 which supply a high voltage and a filament voltage for the rectifier 15. The output of the rectifier 15 is impressed on the filter 16 which reduces the alternating current ripple in the rectified voltage to a low value.

The output voltage of the filter 16 is regulated to maintain a nearly constant amplitude by means of the electronic voltage regulator 17 comprising a resistor 18 connected in series with the anode of the vacuum tube 22. The cathode of the tube 22 is maintained at a constant potential by means of the gaseous regulator tube 23 and the resistance 24 connected to the positive terminal 25. The potentiometer 26 is connected between the anode of tube 22 and ground, the movable arm thereof being connected to the control grid of the tube, so that variations in the anode voltage of the tube 22 are applied to the grid. Since the cathode of tube 22 is maintained at a constant potential, variations in anode voltage vary the grid potential relative to the cathode and therefore vary the conduction of the tube to vary the voltage drop of the resistors 16 and 18. The voltage drop of the resistors 16 and 18 serves to maintain the anode voltage substantially constant. If the resistors 16 and 18 and the potentiometer are properly proportioned in resistance, the potential may be maintained within a small fraction of a percent.

The variable resistances 31 and 36 may take any desired form, but should have linear resistance elements. As illustrated in Fig. 1, the variable resistance 31 consists of a movable arm 32 and a tapped resistance element 30 having seven contact points having equal resistances therebetween, the contact arm 32 being connected to the anode of tube 22 and the clockwise end of the counter-clockwise end of the resistance element 40 of the potentiometer 41.

The variable resistance 36 is similar to variable resistance 31 and has its movable arm 37 connected to ground. The counter-clockwise end of the resistance element 35 is connected to the clockwise end of the resistance element 40. The movable arms 32 and 37 are mechanically connected together by any suitable ganging means and to the control knob 44 so that actuation of the control knob 44 operates both variable resistances simultaneously.

The resistance element 40 of the potentiometer 41 has a resistance equal to or slightly greater than the resistance between the contact points on the resistance elements 30 and 35. For the purposes of illustration, the resistance elements 30 and 35 have a total resistance of 45 megohms tapped at 7½ megohm intervals, while the resistance element 40 has a resistance of 10 megohms. The resistance proportioning network therefore has an effective resistance of 55 megohms, and the potentiometer 41 has an effective range slightly broader than a step of the variable resistors to facilitate adjustment.

The contacts 45 associated with the variable resistances 31, 36 provide an "off" position in which the output terminal 46 connected with the movable arm 42 is entirely disconnected from the power supply. The condenser 47 and the voltmeter 48 are connected between the movable arm 42 and ground to stabilize and indicate the voltage impressed thereon respectively.

In operation, the operator energizes the oscillator 11 and adjusts the potentiometer 26 to regulate the maximum voltage produced by the power supply. Once the potentiometer 26 has been adjusted, no further adjustment is necessary. The variable resistances 31, 36 are operated by the control knob 44 to adjust the output voltage to approximately the desired voltage as indicated by the voltmeter 48 and the potentiometer 41 is then varied to produce the precise voltage desired. Thereafter, the output voltage appearing at terminal 46 will remain within a small fraction of one per cent of the desired voltage.

Figure 2:
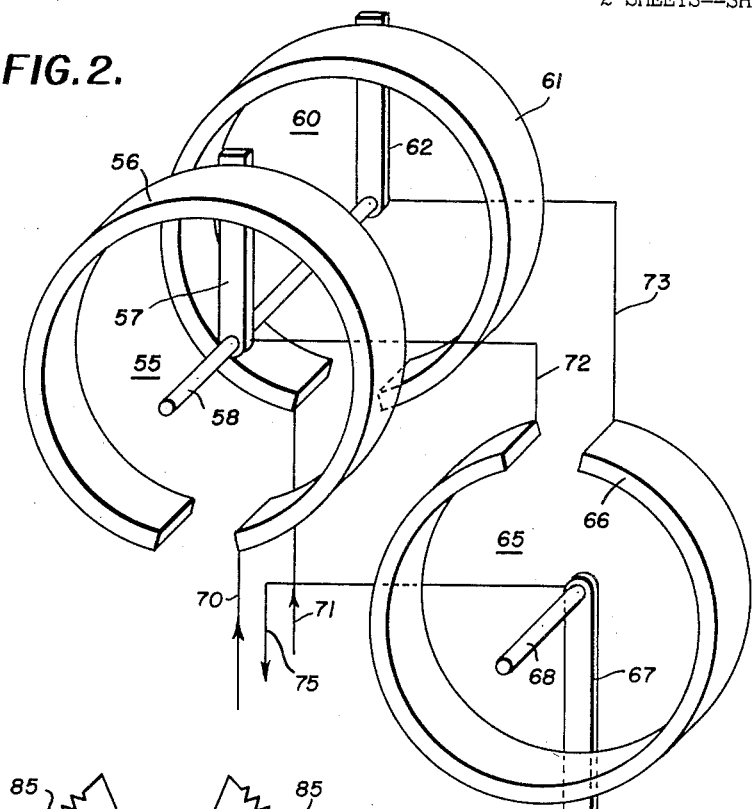
Fig. 2 illustrates a modification of the present invention.

A modification of the present invention is shown in Fig. 2. The variable resistances 55, 60 each contain a circular resistance element 56, 61 upon which the rotatable arms 57, 62, bears respectively while the potentiometer 65 is composed of the resistance element 66 and the rotatable arm 67. The rotatable arms 57, 62 are mounted on the insulated shaft 58, and are rotated as a unit, while the rotatable arm 67 is mounted on the shaft 68.

The electrical input to the resistance proportioning network is connected to opposed ends of the resistance elements 56, 61 through the wires 70, 71 and the rotatable arms 56, 61 are connected to respective ends of the resistance element 66 by wires 72 and 73. The adjustable top of the network being taken off from the movable arm 67 by the wire 75.

The resistant element 66 should have a resistance only a fraction of the resistance of resistance elements 56 and 61 to provide an expanded angular adjustment of the desired network setting. The shaft 58 is rotated to approximately the desired setting and final adjustment of the setting is made by means of shaft 68.

Figure 3:
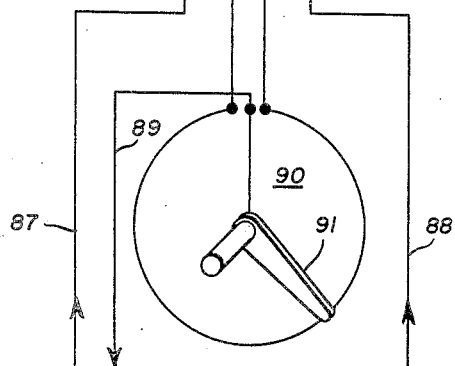
Fig. 3 is a further modification of the present invention.

In certain cases, it is difficult to provide in resistance elements variable resistances which have exactly linear resistance characteristics, but it is relatively simple to construct fixed resistors having accurately determined resistances. It is therefore desirable in some cases to construct variable resistances having a plurality of accurate fixed resistances and employ only a single continuously variable potentiometer so that the linearity of the resistance proportioning network is improved by a considerable factor. Such a network is shown in Fig. 3, in which the two-pole multi-position switch 80 serves to adjust the number of fixed resistance 85 included in the circuit with the continuously variable potentiometer 90. The switch 80 may be of any desired construction known to those skilled in the art, and as shown herein has eight contacts 81 arranged in a circle cooperating with a double ended rotary contact arm 82. Fixed resistors 85 of any desired construction are connected between consecutive contacts 81 to form two similar series of resistors, and respective ends of the contact arm 82 are connected to ends of the potentiometer 90. The input of the resistance proportioning network is through the wires 87 and 88, and the arm 91 of the potentiometer 90 is connected to the output of the network by wire 89.

The resistance of the potentiometer 90 is of approximately the same resistance as the fixed resistors 85. The arm 82 is rotated to roughly the desired electrical position of the arm 91, after which the final adjustment is made by means of the arm 91.

It should be understood, of course, that the foregoing disclosure relates to only preferred embodiments of the invention and that it is intended to cover all changes and modifications of the examples of the invention herein chosen for the purposes of the disclosure, which do not constitute departures from the spirit and scope of the invention as set forth in the appended claims.

What is claimed is:

1. In a resistance proportioning network, first and second variable resistances, a potentiometer having a resistance element and a slidable contact, means for controlling said first and second variable resistances simultaneously in opposite senses, and circuit means connecting said variable resistances to respective ends of said resistance elements, whereby the sum of the resistances of said first and second resistances remains constant and said slidable contact provides a vernier adjustment of said variable resistances.

2. In a resistance proportioning network, first and second variable resistances having the same resistance characteristics and total resistance, a potentiometer having a resistance element and a sliding contact, means mechanically connecting said first and second variable resistances for simultaneous operation in opposite senses, and circuit means connecting said variable resistances to respective ends of said potentiometer, whereby operation of said variable resistances changes the electrical position of said potentiometer in the series circuit of said first and second variable resistances and said resistance element and said sliding contact provides a vernier adjustment for said variable resistances.

3. In a resistance proportioning network, first and second variable resistances having the same total resistance and the same linear rate of change of resistance, mechanical operating means interconnecting said variable resistances operable to increase the resistance of one of said variable resistances simultaneously with decreasing the resistance of the other, a potentiometer having a resistance element and a slidable contact, and means connecting the ends of said resistance element to said first and second variable resistances respectively, whereby the electrical position of the slidable contact is approximately positioned by said variable resistances and finally positioned by sliding said slidable contact on said potentiometer.

4. In a resistance proportioning network, first and second variable resistances each having a high predetermined maximum resistance, mechanical operating means connected to said first and second variable resistances to simultaneously increase the resistance of one of said variable resistances and decreasing the resistance of the other of said variable resistances by the same resistance value, a potentiometer comprising a resistance element having a resistance less than one-half the maximum resistance of said variable resistances having its ends connected to said variable resistances respectively and a slidable contact thereon, whereby said mechanical operating means determines the electrical position of said resistance element and the position of said slidable contact may be accurately adjusted.

5. In a resistance proportioning network, first and second variable resistances each comprising a multiple position switch having a plurality of fixed contacts, a movable arm contacting a selected one of said fixed contacts, and a plurality of resistances each having a predetermined resistance connected between consecutive contacts, a potentiometer having a resistance element having a resistance approximately equal to said predetermined resistance and a slidable contact thereon, mechanical operating means connected to said movable arms to simultaneously increase the resistance of one of said variable resistances while decreasing the resistance of the other of said variable resistances, and circuit means connecting the ends of said resistance element to said variable resistances respectively, whereby said mechanical operating means controls the electrical position of said potentiometer and said slidable contact functions as a vernier control.

LOTHAR M. SCHMIDT.

No references cited.